United States Patent Office 3,546,198
Patented Dec. 8, 1970

3,546,198
PROCESS FOR THE SYNTHESIS OF BRADYKININ AND OTHER ARGININE CONTAINING PEPTIDES
Robert H. Mazur, Deerfield, Ill., assignor to G. D. Searle & Co., Chicago, Ill., a corporation of Delaware
No Drawing. Filed Mar. 26, 1968, Ser. No. 715,950
Int. Cl. C07c *101/04, 103/52, 129/00*
U.S. Cl. 260—112.5                                       3 Claims

ABSTRACT OF THE DISCLOSURE

A process and intermediates for the manufacture of arginine or peptides containing one or more arginine residues which comprises contacting the corresponding $N^G$-hydrocarbonsulfonyl intermediates with hydrogen fluoride. A specific example of this process is the conversion of $N^G, N^G$-ditosylbradykinin to bradykinin.

---

The present invention consists of a novel process and novel intermediates for the manufacture of arginine or peptides containing one or more arginine residues. More particularly, the invention involves intermediates wherein the amino function of the guanido group of arginine is protected by hydrocarbonsulfonyl radical and also the process whereby that protecting group is removed by reaction with hydrogen fluoride.

Protection of the guanido amino group, represented hereinafter by the designation $N^G$, of arginine has long been of concern to those involved in peptide synthesis.

The $N^G$-nitro protecting group has been used to some extent, but that method suffers from a number of disadvantages. Thus, the $N^G$-nitro group is quite reactive toward hydrazine, so that those intermediates are impractical for use in the azide method of peptide synthesis. Removal of the $N^G$-nitro group also involves a number of difficulties. The preferred method consists of catalytic hydrogenation, but prolonged reaction times are generally needed. Electrolytic reduction at a mercury cathode has also been utilized. In both of those methods, it is frequently observed that the reduction does not proceed to completion, but rather stops at the aminoguanido stage. Chemical reduction is also unsatisfactory. The use of zinc and hydrochloric acid has thus been found not to proceed satisfactorily. When the sodium-liquid ammonia method is used, removal of the protecting group is accompanied by the competing side reaction involving cleavage of the guanido function to afford the ornithine rather than the arginine residue. Another disadvantage of the $N^G$-nitro protecting group stems from the fact that side reactions are not avoided. Bodanszky and Sheehan, Chem. Ind. (London), p. 1423 (1964) thus report that lactam formation occurred to afford, as the main product, carbobenzoxynitro-L-arginine lactam when the preparation of the p-nitrophenyl ester of carbobenzoxynitro-L-arginine was attempted. That lactam, unfortunately, is not useful as an intermediate in view of its unreactivity toward amino acid esters. Cyclization between the guanido and α-amino function of $N^G$-nitro-L-arginine was observed by Paul et al., J. Org. Chem., 26, 3347 (1961) when an attempt was made to attach the tert.-butyloxycarbonyl protecting group.

The carbobenzoxy group also has been used to protect the guanido function of arginine, but the method of preparing those intermediates is cumbersome. The necessary reagent, i.e. carbobenzoxy chloride, must be prepared from phosgene, an extremely noxious gas.

The criteria for suitability of a protecting group in peptide synthesis are introduction of the group in high yield, inertness toward the usual reagents and conditions of peptide synthesis and removal of the group in high yield under mild conditions. The p-toluenesulfonyl (tosyl) group has been found to meet the first two of those criteria when applied to the guanido function of arginine. Thus, L-arginine is first allowed to react with carbobenzoxy chloride, resulting in acylation of the α-amino group to afford $N^\alpha$-carbobenzoxy-L-arginine. The latter substance is then acylated with p-toluenesulfonyl chloride at pH 11–12 to afford $N^\alpha$-carbobenzoxy-$N^G$-tosyl-L-arginine. Removal of the $N^\alpha$-carbobenzoxy group is conveniently effected by catalytic hydrogenation, thus producing $N^G$-tosyl-L-orginine. The only previously known method for effectively removing the $N^G$-tosyl group involves use of the sodium in liquid ammonia reagent. This method is characterized by a number of disadvantages, e.g. poor solubility of peptides in the reaction medium, the inconvenience of handling metallic sodium, the inability to carry out the process above the boiling point of liquid ammonia, i.e. −33° C., the necessity of adding an acidic reagent to neutralize the sodium amide formed, and the incidence of side-reactions such as reductive cleavage of certain peptide bonds.

The present invention involves the discovery that a hydrocarbonsulfonyl protecting group attached to the guanido amino group of arginine or of an arginine residue contained in a peptide can be removed in excellent yield and without competing side reactions by use of the very convenient reagent, i.e. hydrogen fluoride. This discovery is particularly surprising in view of the disclosure by Sakakibara et al., Bull. Chem. Soc. Japan, 40, 2164 (1967) that the tosyl group is stable in hydrogen fluoride.

The present process offers a number of advantages over the sodium-liquid ammonia method for cleaving the $N^G$-tosyl group. As has been observed by Katz, Arch. Biochem. Biophys., 51, 293 (1954), hydrogen fluoride is an excellent solvent for peptides. The boiling point, i.e. 20° C., of hydrogen fluoride provides an automatic control of the reaction temperature and affords a convenient effective temperature range over which the process can be conducted. Hydrogen fluoride serves the dual role of reagent and solvent so that no additional materials need be added. Thus, no further reagents need be used during isolation of the product, that isolation being conveniently conducted merely by evaporation of the hydrogen fluoride.

The intermediates useful in the present process may be represented by the following partial structural formula

wherein R represents a hydrocarbon radical. The hydrocarbon radicals especially preferred are alkyl containing not more than eight carbon atoms, as exemplified by methyl, ethyl, propyl, butyl, isobutyl, sec.-butyl, etc., aryl such as phenyl and tolyl, as well as aralkyl radicals such as benzyl and phenethyl. In that partial representation the unsatisfied valences signify that either arginine itself or the arginine residue as a component of a peptide is contemplated.

The present process is conveniently conducted at temperatures not higher than 20° C., i.e. the boiling point of hydrogen fluoride. The reaction time will, of course, vary with the temperature, but it has been observed that a total of 1 hour within the range of 0–20° C. is satisfactory. Thus, the process is typified by the reaction of L-arginyl(tosyl)-L-prolyl-L-prolyl - glycyl - L - phenylalanyl-L-seryl-L-prolyl-L-phenylalanyl-L-(tosyl)arginine (ditosylbradykinin) with hydrogen fluoride at 0–20° C. for 1 hour to afford the detosylated nonapeptide, i.e. bradykinin. That ditosyl intermediate is obtained by catalytic hydrogenation of carbobenzoxy - L - arginyl(tosyl)-L-prolyl-L- prolyl-glycyl-L-phenylalanyl-L-seryl-L-prolyl - L - phenylalanyl-L-(tosyl)arginine.

The instant intermediates are additionally useful in view of their valuable pharmacological properties. Ditosylbradykinin, for example, exhibits the ability to effect the contraction of smooth muscle, which property is characteristic of the known hypotensive agent bradykinin. The following assay was used for determination of that activity:

The distal portion of the guinea pig ileum, approximately 2 cm. long, is suspended in a 2 ml. bath containing Tyrode solution, i.e. an aqueous solution of the following composition, expressed in g./l.:

| | |
|---|---|
| Sodium chloride | 8.000 |
| Potassium chloride | 0.200 |
| Calcium chloride dihydrate | 0.033 |
| Magnesium chloride hexahydrate | 0.053 |
| Sodium carbonate | 1.000 |
| Sodium dihydrogen phosphate monohydrate | 0.014 |
| Dextrose | 1.000 |

The test compound is added to the bath while the temperature is maintained at 37° C. and the resulting contractions of the ileum are detected by an isotonic transducer and recorded on an E & M Physiograph. When ditosylbradykinin was tested in this assay at doses of 50, 100 and 200 mcg./ml. and was compared with bradykinin at doses 0.0025, 0.005, 0.01 and 0.02 mcg./ml., it was found to possess the smooth muscle contracting activity typical of bradykinin, as evidenced by the dose response lines which were not significantly non-parallel to those of bradykinin, as determined by the method of Bliss, C.I., The Statistics of Bioassay, Academic Press, New York (1952).

The instant intermediates are additionally useful in the manufacture of other arginine-containing peptides, which are exemplified by angiotensin, vasopressin and the α-melanocyte-stimulating hormone.

The invention will appear more fully from the examples which follow. These examples are given by way of illustration only and are not to be construed as limiting the invention either in spirit or in scope as many modifications both in materials and methods will be apparent from this disclosure to those skilled in the art. In these examples temperatures are given in degrees centigrade (° C.) and quantities of materials are expressed in parts by weight.

EXAMPLE 1

To a solution of 7.5 parts of carbobenzoxy-L-$N^G$-tosyl-arginyl-L-prolyl-L-prolyl-glycyl-L-phenylalanyl - L - seryl-L-prolyl-L-phenylalanyl-L-$N^G$-tosylarginine in 250 parts by volume of 90% acetic acid is added 0.75 part of palladium black and that mixture is shaken with hydrogen at room temperature under a pressure of 4 atmospheres until the reaction is complete. After separation of the catalyst by filtration, the crude product is isolated by removal of the solvent under reduced pressure. That material is purified by countercurrent distribution in a solvent system consisting of methanol, water, chloroform and carbon tetrachloride. The pure $N^G,N^G$-ditosylbradykinin is obtained as an amorphous powder and is shown to be homogeneous by silica thin layer chromatogram in n-butanolacetic acid-water. This compound exhibits an optical rotation, in acetic acid, of −56°. Its purity is further established by amino acid analysis.

EXAMPLE 2

A solution of 0.5 part of $N^G,N^G$-ditosylbradykinin in 25 parts of liquid hydrogen fluoride is stirred at 0° for about 30 minutes, then is stripped of solvent at approximately 20° over a period of about 30 minutes. The resulting residue is dried over potassium hydroxide, then is purified by gradient elution chromatography on a weakly acidic ion exchange resin, using a linear gradient from 0.1 N acetic acid to glacial acetic acid. The appropriate functions are combined and lyophylized to afford bradykinin as a white powder. Its purity is established by amino acid analysis and also by its potent smooth muscle-contracting activity, equal to 1.25–1.35 that of commercial bradykinin.

What is claimed is:

1. A process for the synthesis of bradykinin which comprises contacting an $N^G,N^G$ - di - (hydrocarbonsulfonyl)-bradybinin, wherein the hydrocarbon radical is selected from the group consisting of lower alkyl, phenyl, tolyl and phenyl-(lower alkyl), with anhydrous hydrogen fluoride, thereby removing the $N^G$-hydrocarbonsulfonyl groups.

2. The process of claim 1 which comprises contacting $N^G,N^G$-ditosylbradykinin with anhydrous hydrogen fluoride.

3. The process of claim 1 which comprises contacting $N^G,N^G$-ditosylbradykinin with anhydrous hydrogen fluoride at 0–20° C.

References Cited

UNITED STATES PATENTS 3,216,993  11/1965  Bodanszky et al. _____ 260—112.5
3,230,211  1/1966  Nicolaides _____ 260—112.5

OTHER REFERENCES

Mazur et al.: Experientia 24, 661 (1968).
Pless et al.: Helv-Chim. Acta 45, 394–396 (1962).
Sakakibara et al.: Bull. Chem. Soc., Japan, 38, 1412–1413 (1965).
Sakabibara et al.: Bull. Chem. Soc., Japan, 40, 2164–2167 (1967).
Sakakibara et al.: Bull. Chem. Soc., Japan, 41, 438–441 (1968).

LEWIS GOTTS, Primary Examiner

M. M. KASSENOFF, Assistant Examiner

U.S. Cl. X.R.

260—534; 424—177